United States Patent Office 3,558,634
Patented Jan. 26, 1971

---

3,558,634
CERTAIN PYRIDYL ESTERS OF SCOPOLAMINE
Sheldon Levy, Merrick, and Frank P. Marchese, Bronxville, N.Y., assignors to Revlon, Inc., a corporation of Delaware
No Drawing. Continuation-in-part of application Ser. No. 775,180, Nov. 12, 1968. This application Apr. 24, 1969, Ser. No. 819,124
Int. Cl. C07d *43/06*
U.S. Cl. 260—292                                     11 Claims

ABSTRACT OF THE DISCLOSURE

Scopolamine derivatives of the formula

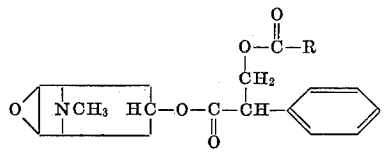

wherein R is pyridyl or a fluoro- or trifluoro-phenyl and their N-oxides and acid addition and quaternary ammonium salts have strong antiperspirant activity of long duration.

---

This patent application is a continuation-in-part application of our application Ser. No. 775,180, filed Nov. 12, 1968.

This invention relates to new scopolamine derivatives. More particularly it relates to antiperspirant pyridyl and phenyl carboxylic acid esters of scopolamine having the formula

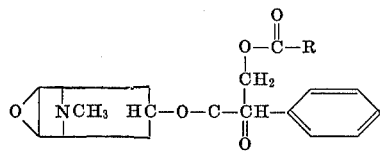

wherein R is pyridyl, substituted pyridyl, or a phenyl derivative of the formula

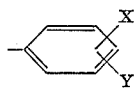

wherein X is fluoro or trifluoromethyl and Y is hydrogen, fluoro or trifluoromethyl, their N-oxides, and the pharmaceutically acceptable non-toxic acid addition and quaternary ammonium salts of said esters, and to a process for the preparation of said esters.

Preferably, the phenyl is mono-substituted, and more preferably the fluoro or trifluoromethyl is in the meta or para position.

The pyridyl carboxylic acid moiety may be picolinic, nicotinic or isonicotinic acid and may be substituted or unsubstituted. Preferred substituents are lower alkyl and hydroxy.

Suitable acid addition salts, which may be either mono-/or di- when R is pyridyl, include the hydrochloride, hydrobromide, phosphate, sulfate, citrate, acetate, lactate, malate, succinate, maleate, malonate fumarate, benzoate, cinnamate, mandelate, salicylate, nicotinate, and the like.

Suitable quaternary ammonium salts, which may be either mono- or di- when R is pyridyl, are formed from the free esters and alkyl, alkenyl, cycloalkyl and phenyl lower alkyl halides or sulfates such as methyl chloride, methyl bromide, methyl iodide, ethyl bromide, ethyl iodide, hexyl bromide, octyl chloride, octyl iodide, dodecyl bromide, myristyl bromide, cetyl chloride, allyl bromide, cyclohexyl chloride, benzyl chloride, phenethyl chloride, methyl sulfate and the like. The alkyl, alkenyl or cycloalkyl groups may carry one or more substituents such as hydroxyl, alkoxyl, hydroxyalkoxyl, alkoxyalkoxyl, oxo, nitro and carboxyl, and the phenyl radical may be substituted with such groups as hydroxyl, alkoxyl, sulfhydryl, lower alkyl, halogen and carboxyl. The N-oxides may be prepared in the usual manner by treating the free base with an oxidizing agent such as a per acid like perbenzoic and peracetic acids. If desired, the pyridine carboxylic acid may first be converted to its N-oxide prior to esterification.

In accordance with this invention the esters are prepared by contacting scopolamine with a halide of the formula

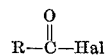

where R is the same as above and Hal is a halogen, preferably chlorine, in an inert solvent in the presence of a tertiary amine such as pyridine or triethylamine. The reaction is preferably carried out at ambient temperature, but may also be carried out at the boiling point of the inert solvent. Suitable solvents include benzene, dioxane, toluene, xylene, and the like.

The esters may also be prepared by heating an appropriately substituted benzoic or pyridine carboxylic acid with scopolamine in an inert water-immiscible solvent such as benzene or toluene and removing the water by azeotroping.

Other methods of preparing the ester include: the reaction of an appropriately substituted acid anhydride with scopolamine, the reaction of an appropriately substituted acid halide with a metal derivative of scopolamine, the reaction of an appropriately substituted acid and butyl chloroformate with a metal derivative of scopolamine, and the reaction of an appropriately substituted acid with an ester of scopolamine and a low boiling acid, such as acetic.

The acid addition or quaternary ammonium salt is readily obtained by contacting the free ester with the desired amount of the acid or appropriate halide or sulfate in an inert solvent.

In comparison with known antiperspirants, the new scopolamine esters of this invention demonstrate both greater activity and longer duration of activity when tested on human subjects, according to axilla and forearm methods described in British Pat. No. 940,279. The compounds exhibited strong antiperspirant activity for over 96 hours after a single application.

In addition the compounds of this invention possess anticholinergic, antispasmodic, and antimicrobial activity. The latter activity is particularly useful in antiperspirants since the reduction or elimination of microbial action helps in reducing or eliminating odor.

The antiperspirant compounds of this invention are preferably used in topical compositions containing from about 0.0001% to 0.3% by weight of the active material. Preferably, from 0.025 to 0.1% is used. The compound may be formulated in such compositions as lotions, solutions and creams which may be applied to the body directly by hand or by applicator such as, for example, aerosol spray, brush-on, or roll-on. Preferably, the pH range of these compositions is from about 3.0 to about 6.8, with a more preferred range of about 3.8 to 6.0, and the usual buffering agents may be used to adjust the pH.

In addition to the usual adjuvants, the compositions may contain perfumes, coloring material, other antiperspirants, such as, for example, aluminum or zirconium salts, and other antimicrobials, such as, for example, hexachlorophene.

The invention will be more fully understood from the

EXAMPLE 1

Meta-fluorobenzoyl-scopolamine

To a solution of 0.1 mol scopolamine and 25 ml. pyridine in 150 ml. benzene, 0.12 mol of m-fluoro-benzoyl chloride was slowly added. The resulting solution was stirred for several hours. The precipitate was treated with a cold solution of sodium carbonate and the mixture extracted with ether. Upon evaporation of the ether, the free m-fluorobenzoyl-scopolamine was obtained as a viscous oil which solidified on standing.

EXAMPLE 2

Meta-fluorobenzoyl-scopolamine hydrobromide

To 0.05 mol m-fluorobenzoyl-scopolamine, dissolved in ether, 0.05 mol HBr dissolved in ether was added. The salt precipitated and was recrystallized from ethanol-ether. M.P. 174–76° C.

Following the procedures of Examples 1 and 2 the following compounds were prepared:

| X | Salt | M.P. (° C.) |
|---|---|---|
| p-F | HBr | 192–5 |
| p-F | $CH_3I$ | 186–8 |
| p-F | $CH_3Br$ | 169–71 |
| o-F | HBr | 100–1 |
| o-F | $CH_3I$ | 188–90 |
| o-F | $CH_3Br$ | 190–1 |
| m-F | $CH_3Br$ | 218–219 |
| m-F | $CH_3Cl$ | 188–90 |
| m-F | $CH_3I$ | 192–4 |
| m-F | HCl | 171–3 |
| p-$CF_3$ | HBr | 100–2 |
| m-F | $C_6H_5CH_2Br$ | 148–50 |
| p-$CF_3$ | $CH_3I$ | 190–1 |
| p-$CF_3$ | $CH_3Br$ | 200–1 |
| m-$CF_3$ | HBr | 169–171 |
| m-$CF_3$ | $CH_3Br$ | 188–189 |
| m-$CF_3$ | $CH_3I$ | 179–81 |

NOTE.—Y=Hydrogen.

EXAMPLE 3

Nicotinoyl-scopolamine dihydrobromide

To a solution of 0.1 mol of scopolamine, 30 ml. of dry pyridine and 180 ml. of dry benzene was slowly added 0.1 mol of nicotinoyl chloride. The resulting solution was stirred for several hours and the precipitate was treated with a cold solution of sodium carbonate to a pH 7.5 and extracted with benzene. The crude yellow nicotinoyl scopolamine was recrystallized from ethanol-petroleum ether. M.P. 79–81°.

To a solution of 0.05 mol of nicotinoyl scopolamine ester base in cold ether was added 0.2 mol of hydrogen bromide in ether. The product was separated and recrystallized several times from isopropyl alcohol-ether. M.P. 85–88° C.

EXAMPLE 4

N-oxide of nicotinoyl-scopolamine

The N-oxide of nicotinoyl chloride was prepared by refluxing 0.1 mol nicotinic acid N-oxide and 0.12 mol oxalyl chloride in 100 ml. of dry benzene for several hours. The product was filtered and washed with ether. M.P. 189–192° C.

To a solution of 0.1 mol of scopolamine, 30 ml. of dry pyridine and 150 ml. of dry benzene was added dropwise 0.13 mole of N-oxide of nicotinoyl chloride in dry benzene. The resulting solution was stirred for several hours and the precipitate was treated with a cold solution of sodium carbonate and the mixture extracted with ether. The product was obtained as an amber oil which solidified to a low melting solid.

The mono methiodide of this ester was obtained by mixing equimolar amounts of the ester and methyl iodide in ethanol and then cooling. The product, recrystallized from ethanol, melted at 180–82° C.

EXAMPLE 5

Nicotinoyl-scopolamine di-methylbromide

A solution of 0.05 mol nicotinoyl scopolamine ester base was treated with 0.2 mol of methyl bromide and the mixture was heated at 40° C. in a sealed tube. The bis quaternary separated and was recrystallized several times from isopropyl alcohol and ethanol. M.P. 148–149° C.

EXAMPLE 6

6-methyl nicotinoyl-scopolamine

To a solution of 0.03 mol of scopolamine, 15 ml. dry pyridine and 50 ml. dry benzene was added .032 mol of 6-methyl nicotinoyl chloride. The resulting solution was stirred for several days and the residue after evaporation of the pyridine was treated with cold sodium carbonate. The aqueous phase was extracted with ether and the combined extracts dried over magnesium sulfate. The product was an oil which was converted to its dihydrobromide which had a melting point of 95–6°.

Following the procedures of Examples 3 to 6, the following compounds were prepared:

| R | Salt | M.P. (°C.) |
|---|---|---|
| 3-Py | $EtO\overset{O}{\underset{\|}{C}}CH_2Br$ | 189–91 |
| 3-Py | 4-F-$C_6H_4CH_2Br$ | 100–5 |
| 3-Py | $(MeBr)_2$ | 198–9 |
| 6-HO-3-Py | $(HBr)_2$ | 118–9 |
| 6-HO-3-Py | $(MeBr)_2$ | 170–74 |
| 4-Py | $(HBr)_2$ | 90–4 |
| 4-Py | $(MeI)_2$ | 170–1 |
| 2-Py | $(HBr)_2$ | 116–8 |
| 2-Py | $(MeBr)_2$ | 172–3 |
| 2-Py | $(MeI)_2$ | 174–6 |
| 3-Py→O | HCl | 95–8 |
| 3-Py→O | HBr | 175–8 |
| 3-Py→O | MeBr | 200–3 |
| 3-Py→O | MeI | 180–2 |
| 3-Py→O | $(HCl)_2$ | 74–7 |
| 3-Py→O | $(HBr)_2$ | 75–6 |
| 3-Py→O | $(MeI)_2$ | 61–2 |
| 3-Py→O [1] | $(HBr)_2$ | 72–4 |
| 3-Py→O [1] | MeBr | 180–2 |

NOTE.—Py-Pyridyl.

[1] These compounds also had an N-oxide on the nitrogen of the scopolamine moiety.

Examples 7–18 show the compositions of antiperspirant preparations containing the compounds of this invention. The preparations were made in the usual manner, and all parts in these examples are by weight.

EXAMPLE 7

Lotion

| | |
|---|---|
| m-Fluoro-benzoyl-scopolamine HBr | .025 |
| Glycerol monostearate | 8.5 |
| Spermaceti wax | 1.3 |
| Lauric myristic diethanolamide | 1.2 |
| Cholesterol absorption base | 0.5 |
| Titanium dioxide | 0.2 |
| Propylene glycol | 7.0 |
| Glycerine | 3.0 |
| Methyl cellulose | 0.5 |
| Polyoxyethylene stearate | 1.5 |
| Mineral oil | 5.0 |
| Perfume | 0.4 |
| Buffer, to pH 3.5. | |
| Water, q.s. 100. | |

EXAMPLE 8

Cream

| | |
|---|---|
| m-Trifluoro-benzoyl-scopolamine HBr | .05 |
| Glycerol monostearate | 12.0 |
| Spermaceti wax | 3.0 |
| Lauric myristic diethanolamide | 1.8 |
| Cholesterol absorption base | 0.8 |
| Titanium dioxide | 0.2 |
| Propylene glycol | 10.0 |
| Glycerine | 5.0 |
| Methyl cellulose | 1.0 |
| Polyoxyethylene stearate | 1.8 |
| Mineral oil | 5.0 |
| Perfume | 0.4 |

Buffer, to pH 6.0
Water, q.s. 100.

EXAMPLE 9

Lotion

| | |
|---|---|
| p-Trifluoro-methyl-benzoyl-scopolamine HBr | .025 |
| Spermaceti wax | 1.3 |
| Glycerol monostearate | 8.5 |
| Lauric myristic diethanolamide | 1.2 |
| Prpoylene glycol | 7.0 |
| Methyl cellulose | 0.5 |
| Perfume | 0.35 |

Buffer, to pH 4.0.
Water, q.s. 100.

EXAMPLE 10

Cream

| | |
|---|---|
| m-Fluoro-benzoyl-scopolamine HBr | .08 |
| Spermaceti wax | 5.0 |
| Lauric myristic diethanolamide | 1.8 |
| Glycerol monostearate | 12.0 |
| Propylene glycol | 10.0 |
| Methyl cellulose | 1.0 |
| Perfume | 0.35 |

Buffer, to pH 3.8.
Water, q.s. 100.

EXAMPLE 11

Lotion

| | |
|---|---|
| m-Fluoro-benzoyl-scopolamine methylchloride | .08 |
| Gluconic acid sodium salt | 3.0 |
| Glycerine | 5.0 |
| Perfume | 0.2 |
| Pluronic F68 | 1.0 |
| Ethanol | 20.0 |

Buffer, to pH 5.8.
Water, q.s. 100.

EXAMPLE 12

Roll on

| | |
|---|---|
| o-Fluoro-benzoyl-scopolamine HBr | .05 |
| Gluconic acid sodium salt | 5.0 |
| 2% Methyl celluose solution | 15.0 |
| Ethanol | 20.0 |
| Pluronic F68 | 1.0 |

Buffer, to pH 5.5.
Water, q.s. 100.

EXAMPLE 13

Composition for use in aerosol

| | |
|---|---|
| m-Fluoro-benzoyl-scopolamine HBr | .025 |
| m-Trifluoro-benzoyl-scopolamine methylchloride | .025 |
| Propylene glycol | 1.08 |
| Perfume | 0.3 |
| Hexachlorophene | .16 |
| Ethanol | 63.46 |
| Propellant 12 | 35 |

Buffer, to pH 4.2.

EXAMPLE 14

Lotion

| | |
|---|---|
| Nicotinoyl-N-oxide-scopolamine methylioide | .1 |
| Glycerol monostearate | 8.5 |
| Spermaceti wax | 1.3 |
| Lauric myristic diethanolamide | 1.2 |
| Cholesterol absorption base | 0.5 |
| Titanium dioxide | 0.2 |
| Propylene glycol | 7.0 |
| Glycerine | 3.0 |
| Methyl cellulose | 0.5 |
| Polyoxyethylene stearate | 1.5 |
| Mineral oil | 5.0 |
| Perfume | 0.4 |

Buffer, to pH 3.5.
Water, q.s. 100.

EXAMPLE 15

Cream

| | |
|---|---|
| Nicotinoyl-N-oxide-scopolamine HBr | .25 |
| Glycerol monostearate | 12.0 |
| Spermaceti wax | 3.0 |
| Lauric myristic diethanolamide | 1.8 |
| Cholesterol absorption base | 0.8 |
| Titanium dioxide | 0.2 |
| Propylene glycol | 10.0 |
| Glycerine | 5.0 |
| Methyl cellulose | 1.0 |
| Polyoxyethylene stearate | 1.8 |
| Mineral oil | 5.0 |
| Perfume | 0.4 |

Buffer, to pH 6.0.
Water, q.s. 100.

EXAMPLE 16

Lotion

| | |
|---|---|
| m-Trifluoro-methyl-benzoyl-scopolamine HBr | 0.025 |
| Aluminum chlorhydroxide | 20.00 |
| Spermaceti wax | 1.5 |
| Glycerol monostearate | 7.5 |
| Propylene glycol | 6.8 |
| Methyl cellulose | 0.5 |
| Perfume | 0.2 |

Buffer, to pH 3.5.
Water, q.s. 100.

EXAMPLE 17

Lotion

| | |
|---|---|
| m-Fluoro-benzoyl-scopolamine HBr | 0.05 |
| Spermaceti wax | 1.5 |
| Hexachlorophene | 0.5 |
| Glycerol monostearate | 7.2 |
| Propylene glycol | 6.8 |
| Methyl cellulose | 0.5 |
| Perfume | 0.2 |

Buffer, to pH 4.0.
Water, q.s. 100.

EXAMPLE 18

Solution

| | |
|---|---|
| m-Trifluoro-benzoyl-scopolamine HBr | 0.1 |
| Ethanol | 20.0 |
| Pluronic F68 | 1.0 |

Buffer, to pH 4.0.
Water, q.s. 100.

We claim:
1. A compound of the formula wherein R is pyridyl or their N-oxides and their pharmaceutically acceptable, non-toxic acid addition and lower-alkyl quaternary ammonium salts thereof.

2. A compound according to claim 1, wherein R is pyridyl.

3. A compound according to claim 2, wherein R is 3-pyridyl.

4. The di-hydrobromide of a compound according to claim 3.

5. The di-methylbromide of a compound according to claim 3.

6. The pyridyl N-oxide of a compound according to claim 3.

7. The pyridyl N-oxide of a compound according to claim 4.

8. The methyliodide of a compound according to claim 6.

9. The hydrobromide of a compound according to claim 6.

10. A compound according to claim 2 wherein R is 4-pyridyl.

11. A compound according to claim 2 wherein R is 6-methyl-3-pyridyl.

References Cited

UNITED STATES PATENTS

| | | | |
|---|---|---|---|
| 3,312,709 | 4/1967 | Kilmer | 260—292 |
| 3,472,861 | 10/1969 | Zeile et al. | 260—292 |

ALAN L. ROTMAN, Primary Examiner

U.S. Cl. X.R.

424—265